US007177924B2

(12) United States Patent
Murray et al.

(10) Patent No.: US 7,177,924 B2
(45) Date of Patent: Feb. 13, 2007

(54) COMMAND LINE INTERFACE PROCESSOR WITH DYNAMIC UPDATE OF ATTRIBUTE DEPENDENCIES

(75) Inventors: Christopher Warren Murray, Ottawa (CA); David Wing-Chung Chan, Nepean (CA); Thomas Vincent Flynn, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 548 days.

(21) Appl. No.: 10/222,874

(22) Filed: Aug. 19, 2002

(65) Prior Publication Data
US 2003/0115305 A1 Jun. 19, 2003

(51) Int. Cl.
*G06F 15/173* (2006.01)
*G06F 15/16* (2006.01)

(52) U.S. Cl. ...................... 709/223; 709/224
(58) Field of Classification Search ............... 709/223, 709/224
See application file for complete search history.

(56) References Cited

U.S. PATENT DOCUMENTS

| 5,533,116 | A | | 7/1996 | Vesterinen | |
|---|---|---|---|---|---|
| 5,764,955 | A | | 6/1998 | Doolan | |
| 5,892,950 | A | * | 4/1999 | Rigori et al. | 717/146 |
| 5,991,814 | A | * | 11/1999 | Rzonca et al. | 709/237 |
| 7,002,974 | B1 | * | 2/2006 | Deerman et al. | 370/401 |
| 7,007,130 | B1 | * | 2/2006 | Holman | 711/5 |
| 2002/0032769 | A1 | * | 3/2002 | Barkai et al. | 709/224 |
| 2002/0099790 | A1 | * | 7/2002 | Mosher et al. | 709/217 |
| 2002/0124064 | A1 | * | 9/2002 | Epstein et al. | 709/221 |
| 2002/0157020 | A1 | * | 10/2002 | Royer | 713/201 |
| 2002/0191619 | A1 | * | 12/2002 | Shafer | 370/401 |

OTHER PUBLICATIONS

GA, Halse, et al., "XML to facilitate management of multi-vendor networks", South African Telecommunications Network and Application Conference, 2001, pp. 1-6.
Shafer, Phil, "XML-based network management", Juniper Networks, 2001, pp. 1-18.

* cited by examiner

*Primary Examiner*—Beatriz Prieto
*Assistant Examiner*—Michael D. Meucci
(74) *Attorney, Agent, or Firm*—Marks & Clerk; S. Mark Budd (57) ABSTRACT

The solution provides automated Command Line Interface (CLI) based configuration management of managed communications network entities. The automation eliminates manual CLI command entry and provides support for independently-developed multi-vendor equipment by using multiple CLI command vocabularies and CLI command dictionaries associated therewith. The solution reduces communications network entity management costs, downtime, and training time for analysts. The advantages are derived from a generic design of software applications and a manageable object type derivation hierarchy, reducing operational over heads by shielding thereof from updates to the CLI command grammar and/or vocabulary. The methods and apparatus presented herein remove the need for software applications and manageable object type derivation hierarchy to be hard-coded with knowledge of attribute dependencies of CLI commands for each vendor equipment/type supported. The deployment of generically coded manageable object type derivation hierarchy and software applications, is easier to develop and maintain, and would therefore benefit from reduced costs.

10 Claims, 3 Drawing Sheets

COMMAND LINE INTERFACE PROCESSOR WITH DYNAMIC UPDATE OF ATTRIBUTE DEPENDENCIES

RELATED APPLICATION DATA

This application is an improvement over and claims internal priority from co-pending commonly assigned U.S. patent application Ser. No. 10/115,900, filed Apr. 5, 2002, entitled "Command Line Interface Processor".

FIELD OF THE INVENTION

The invention relates to communications network management, and in particular to command driven multi-vendor equipment management.

BACKGROUND OF THE INVENTION

In the field of communications network management, communications networks are made up of a collection of managed communications network equipment. Communications services are provisioned over the managed communications network equipment.

In a competitive market place, due to a recent explosive technological development, the network management and service provisioning task is complicated by many factors including: multiple communications network equipment vendors having multiple approaches in implementing the communications network equipment; a multitude of data transport technologies, with each vendor specializing in a sub-group of the multitude of data transport technologies; a multitude of network management and service provisioning protocols, with each vendor implementing only a sub-group of the multitude of network management and service provisioning protocols; a multitude of auxiliary network management and service provisioning equipment employing yet another multitude of network management and service provisioning technologies; etc.

Carriers and service providers of communications services are faced with a large operational overhead in operating multi-vendor equipment, while at the same time necessarily employ multi-vendor equipment to leverage the investment risk associated with the installed communications infrastructure.

Communications network equipment includes, but is not limited to: switching equipment, routers, bridges, access nodes providing a multiplexing function, remote access servers, distribution nodes providing a demultiplexing function, customer premise equipment, etc. with next generation communications equipment in development. Communications network include data transport networks as well as circuit-switched networks.

Figure 1:
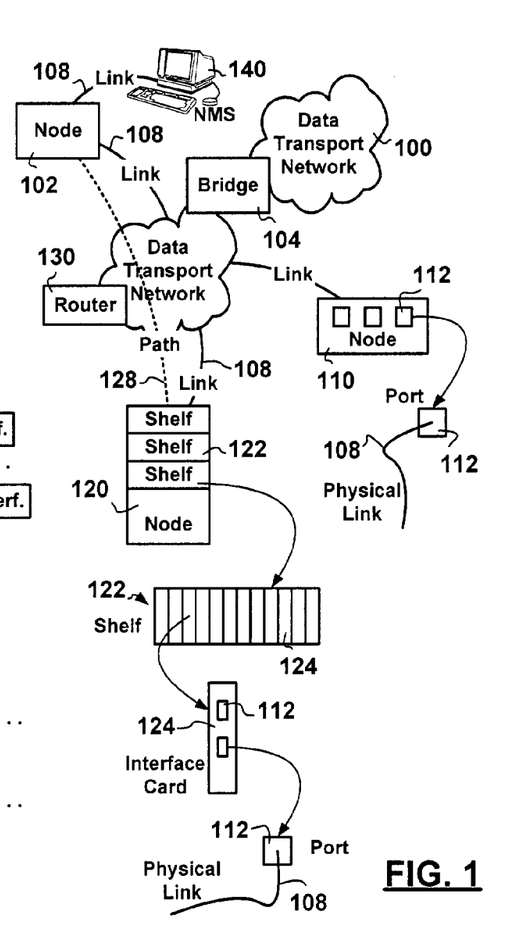
FIG. 1 is a schematic diagram showing data network elements implementing connected communications networks.

With regards to communications network equipment, for example switching nodes schematically shown in FIG. 1, a vendor may chose to implement an integral device 110 having a switching processor and a group of ports 112, while another vendor may chose a customizable implementation of a switching node 120 including: a switching fabric, an equipment rack divided into shelves, each shelf 122 having slot connectors for connection with interface cards, each interface card 124 having at least one port 112. Although conceptually the two switching nodes 110 and 120 provide the same switching function, each implementation is adapted for a different environment: the former switching node 110 being more adapted to provide enterprise solutions as a private communications network node, perhaps being further adapted to enable access to public communications services; while the latter switching node 120 is better adapted for high data throughput in the core of public communications networks. Typically the former (110) implements a small number of data transport protocols while for the latter (120), data transport protocols are implemented on interface cards 124 and/or ports 112—providing for a flexible deployment thereof. All communications network equipment is subject to design choices which are bound to be different from vendor to vendor.

Data transport technologies include: electrical transmission of data via copper pairs, coaxial cable, etc: optical transmission of data via optical cables; free space optical interconnects, etc.; wireless transmission of data via radio modems, microwave links, wireless Local Area Networking (LAN), etc.; with next generation data transport technologies under development.

Data transport protocols used to convey data between data transport equipment includes: Internet Protocol (IP), Ethernet technologies, Token-Ring technologies, Fiber Distributed Data Interface (FDDI), Asynchronous Transmission Mode (ATM), Synchronous Optical NETwork (SONET) transmission protocol, Frame Relay (FR), X-25, Time Division Multiplexing (TDM) transmission protocol, Packet-Over-SONET (POS), Multi-Protocol Label Switching (MPLS), etc. with next generation data transport protocols under development.

The physical communications network equipment alluded to above is part of a larger body of managed communications network entities enabling the provision of communications services. The communications network entities also include, but are not limited to: virtual routers, logical ports, logical interfaces, end-to-end (data) links, paths, virtual circuits, virtual paths, etc.

Network management and service provisioning enabling technologies include, but are not limited to protocols: Simple Network Management Protocol (SNMP), Common Management Information Protocol (CMIP), Command Line Interface (CLI), etc.; as well includes devices: special function servers, centralized databases, distributed databases, relational databases, directories, network management systems, etc. with next generation devices and technologies under development.

Network management and service provisioning solutions include Network Management Systems (NMS) 140 enabled via special purpose software applications coded to configure and control the above mentioned communications network entities. Such software applications include functionality, not limited to: inventory reporting, configuration management, statistics gathering, performance reporting, fault management, network surveillance, service provisioning, billing & accounting, security enforcement, etc.

It is a daunting task to provide network management and service provisioning solutions taking into account the permutations and combinations of the elements presented above. Prior art approaches to providing network management and service provisioning solutions include the coding of hundreds of software applications with knowledge of hundreds of data networking entities using tens of data transmission and network management protocols. Some prior art solutions attempt to code all-encompassing large monolithic network management and service provisioning software applications.

Coding, deploying, maintaining, and extending such software applications for network management and service provisioning has been and continues to be an enormous undertaking as well as an extremely complex procedure.

Such software applications require a large number of man-hours to create, frequently are delivered with numerous problems, and are difficult to modify and/or support. The difficulty in creating and supporting large applications is primarily due to the inability of existing software development paradigms to provide a simplification of the software development process. In accordance with current coding paradigms, the complexity of the software applications has been shown to increase as an increasing function of the number of different operations that are expected to be performed. Large programming efforts suffer in terms of reasonable performance, reliability, cost of development, and reasonable development cycles.

In the field of data network management, an attempt towards automating configuration and control tasks is being made through the establishment of the SNMP protocol mentioned above. Typically data network elements have an element management interface complying with the SNMP protocol. Although the SNMP protocol has been established, there are data network elements which do not support the SNMP protocol either by design or because these devices have been deployed prior to the standardization of the SNMP protocol. Of the data network elements which do support the SNMP protocol, some do not support all SNMP capabilities.

The ability to configure data network elements using a Command Line Interface (CLI) via a CLI element management interface is more common. Every communications network entity has configurable operational parameters associated therewith. Managed communications network entities are responsive to commands having associated attributes. The CLI commands are typically vendor specific. The Command Line Interface is a text based human-machine mode of interaction responsive to issued text-based CLI commands and typically complimented by textual information feedback. CLI interfaces are used by an analyst to manually enter CLI commands to configure and control a single data network element for management thereof and in provisioning of communications network services therethrough. The entry of CLI commands is considered to be a time consuming and error prone procedure and therefore undesirable. Moreover, human interaction based response to communications network failures is inadequate given the ever increasing amount of throughput conveyed via the communications network equipment. The industry has been searching for methods to automate CLI command based configuration and control tasks.

Various data network element manufacturers have provided an interactive software application to configure a data network element through the associated CLI interface. Such element management software applications tend to be proprietary and tend to address the configuration of one particular data network element type as it was seen fit by the equipment vendor at the time of the development thereof. Typically, such proprietary solutions are non-extensible and do not lend themselves to an integrated management of data network resources rendering their usefulness very limited.

Known attempts of configuration and control of data network elements includes a script based technique proposed by CISCO Systems Inc. The methods used include the manual creation of batch-file scripts from CLI commands, where each script addresses a particular change in the configuration of a particular data network element. Such a CLI command script is downloaded to the particular data network element and it is issued for execution to carry out the desired changes. This attempt relies on an intended goal according to which all CISCO data network elements use a common CLI command syntax also referred to as CLI vocabulary and grammar. Such solutions tend to be limited to a particular vendor equipment, i.e. CISCO routers. Furthermore, such scripts tend to be issued with the expectation that the desired change is carried out.

From time-to-time, as data network elements are updated, the update typically also introduces changes to the CLI vocabulary and/or grammar. The use of complicated scripts tends to hinder the configuration and control of the data network elements as the scripts also have to be updated to reflect changes in the CLI vocabulary and/or grammar. Even small changes to CLI command attributes necessitate changes to such scripts.

Other data network management software vendors have taken other approaches in implementing network management. Service Activator by Orchestream Holdings Plc. makes use of device driver software for CISCO data network element specific configuration. Each device driver includes specific application code for managing a specific data network element type. The device driver code is used to extract a current state of a particular data network element, compare the currently reported state against a virtual state held by the Service Activator software, generate a group of commands which are necessary in synchronizing the virtual and real states, and send the group of commands to be executed by the data network element. The process iterates until the reported state matches the virtual state. This attempt does not address errors generated in issuing commands, rather derives alarms from discrepancies between the current state and the virtual state. This attempt makes use of hard-coded device drivers which contain machine readable object code unintelligible to an analyst attempting to debug such a device driver.

As communications network elements are updated, the use of drivers tends to hinder network element configuration and control as the drivers also have to be updated, re-compiled and re-deployed, to reflect changes in the CLI vocabulary and/or grammar. Even small changes to CLI command attributes necessitate updating such device drivers.

These efforts are all laudable, while the productivity of the development and maintenance of such complex network management and service provisioning solutions suffers. In particular, support for new data network entities, updated CLI vocabularies and/or CLI grammar, requires re-compilation and re-deployment of such solutions. There is always a risk of incorporating further errors in existing code when dealing with such solutions thereby requiring extensive regression testing to verify the integrity of the existing code. Even small changes to CLI command attributes necessitate updating such solutions.

Developments in the art also include co-pending commonly assigned U.S. patent application Ser. No. 10/115,900, filed Apr. 5, 2002, entitled "Command Line Interface Processor" and corresponding Canadian Patent Application 2,365,436, filed Dec. 19, 2001 which describe a CLI framework (220) adapted to create CLI command sequences for a particular vendor's equipment in accordance with the vendor's proprietary CLI command syntax and are incorporated herein by reference.

Figure 2:
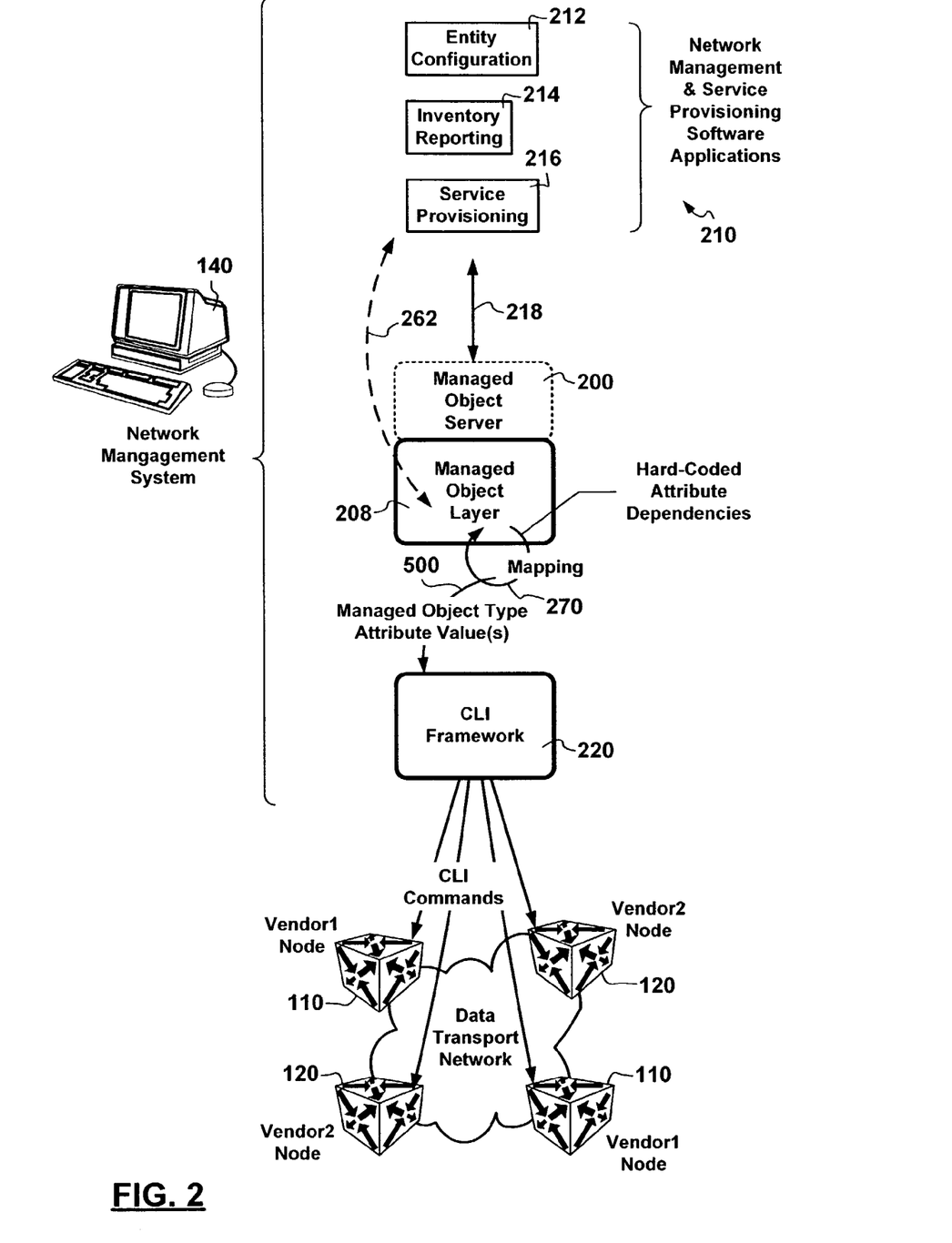
FIG. 2 is a schematic diagram showing elements implementing a network management and service provisioning solution.

As presented in FIG. 2, an analyst provides input via a network management and service provisioning software application 210 executing on the NMS 140. The software applications 210 are shielded from intricacies of enabling technologies by interfacing 218 with a Managed Object Layer (MOL) 208 to request implementation of desired generic actions 262. The requests are event notified 500 to the CLI framework 220 which builds vendor-specific CLI commands to be sent to appropriate communications network elements (nodes). A mapping function 270 is used in shielding the software applications 210 from the intricacies of the CLI enabling technology.

Although network management and service provisioning concepts transcend vendor equipment, knowledge regarding vendor specific CLI command attribute dependencies is held in the MOL 208 for each managed communications network entity supported to enable the mapping function 270. Take the provisioning concept example of using CLI commands to configure a port. For a particular vendor's node, the building of the required CLI command may require the specification of two attributes: interface id, and network address; while for another vendor's node, the building of the required CLI command may require the specification of additional parameters such as interface card and/or shelf specification. In accordance with this solution, in building CLI commands specific to a particular vendor's CLI syntax, the mapping function 270 must have knowledge regarding which attributes are to be used in building CLI commands to provide them to the CLI framework 220. This knowledge is hard-coded in the MOL 208. Since the CLI attributes dependencies are subject to change, the MOL 208 must also be updated, recompiled and re-deployed.

There therefore is a need to devise improved methods of software application code development and maintenance taking into account the above mentioned complexities.

SUMMARY OF THE INVENTION

In accordance with an aspect of the invention, network management and service provisioning Command Line Interface (CLI) framework is provided. The CLI framework has a validation module assessing the correctness of each notification received by the CLI framework, and the validation module provides a corrective feedback output for each incorrectly formatted received notification. For each received notification, a CLI processor determines a selection of CLI commands, from a plurality of CLI commands, to form a CLI command sequence to interact with at least one managed data network entity as specified in a corresponding plurality of CLI vocabulary and grammar specifications. A communications module is used to send the CLI command sequence for execution to the at least one managed data network entity. The validation module provides support for a network management and service provisioning solution adaptive to changes in the CLI vocabulary and grammar.

In accordance with another aspect of the invention, a CLI client entity participating in a network management and service provisioning solution is provided. The CLI client entity uses a notification generator to issue at least one notification generated in accordance with de facto notification generation specifications to effect interaction with at least one managed data network entity. A learning module is operable to amend the de facto notification generation specifications based on received corrective feedback, if the de facto notification specifications led to at least one incorrectly formatted notification sent. The learning module enables a generic implementation of the CLI client entity in support of a network management and service provisioning solution adaptive to changes in the CLI vocabulary and grammar corresponding to the at least one managed data network entity specified via the corrective feedback.

In accordance with a further aspect of the invention, a network management and service provisioning solution is provided. A CLI client entity is operable to issue at least one notification generated in accordance with de facto notification generation specifications. A CLI framework is operable to receive the at least one notification and generate a CLI command sequence based on CLI vocabulary and grammar specifications associated with the at least one managed data network entity. A validation module assesses the correctness of each received notification, and provides a corrective feedback output for each received incorrectly formatted notification. A learning module amends the de facto notification generation specifications based on the corrective feedback. And, a communications module sends the CLI command sequence to the at least one managed data network entity in interacting therewith. The validation module and the learning module enable a generic coding of the CLI client entity in support of a generic network management and service provisioning solution adaptive to changes to the CLI vocabulary and grammar specifications.

In accordance with a further aspect of the invention, a method of interacting with at least one managed data network entity is provided. The correctness of each received notification is assessed. Corrective feedback is provided selectively for each incorrectly formatted received notification. For each received notification, a selection of CLI commands is determined from a plurality of CLI commands to form a CLI command sequence to interact with the at least one managed data network entity as specified in a corresponding plurality of CLI vocabulary and grammar specifications. And, the CLI command sequence is sent for execution to the at least one managed data network entity. Selectively providing corrective feedback provides support for a generic network management and service provisioning solution adaptive to changes in the CLI vocabulary and grammar.

In accordance with a further aspect of the invention, a method of requesting interaction with at least one managed data network entity is provided. De facto notification specifications are consulted. At least one notification generated in accordance with the de facto notification generation specifications is issued. The de facto notification generation specifications are selectively amended based on corrective feedback received, if the de facto notification specifications led to at least one incorrectly formatted issued notification. Selectively amending notification generation specifications provides support for a generic network management and service provisioning solution adaptive to changes in the CLI vocabulary and grammar corresponding to the at least one managed data network entity specified via the corrective feedback.

In accordance with a yet another aspect of the invention, a method of effecting network management and service provisioning is provided. At least one notification is generated to request interaction with at least one managed data network entity in accordance with de facto notification generation specifications. The correctness of each notification is assessed. Corrective feedback is provided for each received incorrectly formatted notification. The de facto notification generation specifications are selectively amended based on the corrective feedback. A CLI command sequence is generated based on CLI vocabulary and grammar specifications associated with the at least one managed data network entity. And, the command sequence sent to the at least one managed data network entity in interacting therewith. The correctness assessment of each notification and the amendment of notification generation specifications enable the provisioning of a generic network management and service provisioning solution adaptive to changes to the CLI vocabulary and grammar.

The solution provides automated configuration management of managed communications network entities when SNMP is not a viable option. The automation eliminates manual CLI command entry and provides support for independently developed multi-vendor equipment by using multiple CLI command vocabularies and CLI command dictionaries associated therewith. The solution reduces data network entity management costs, downtime, and training time for analysts. The advantages are derived from a generic design of software applications 210 and MOL 208, reducing operational overheads by shielding thereof from updates to the CLI command grammar and/or vocabulary. The methods and apparatus presented herein remove the need for software applications 210 and MOL 208 to be hard-coded with knowledge of attribute dependencies of CLI commands for different vendor equipment. The generically coded MOL 208 and software applications 210, is easier to develop and maintain, and would therefore benefit from a less costly deployment.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

FIG. 1 is a schematic diagram showing data network elements implementing connected data transport networks.

Data network nodes 102, 110, 120 are physically interconnected in the data transport network 100 via physical links 108. Data transport networks 100 may be bridged via bridge data network nodes 104 to enable data exchange therebetween. Connected data transport networks 100 can be grouped defining a realm of influence for the purposes of network management and service provisioning.

Physical links 108 provide Open Systems Interconnection (OSI) Layer-1 connectivity between data network nodes 102/104/110/120 physically conveying data for OSI Layer-2 data links between nodes 102/110/120 end-to-end. A Layer-2 data link may be provisioned over at least one physical data link 108—the sequence of physical data links 108 used representing an OSI Layer-3 path 128.

Network management and service provisioning is typically performed with the aid of at least one Network Management System (NMS) 140 connected to at least one node 102 associated with a data transport network 100.

Figure 3:
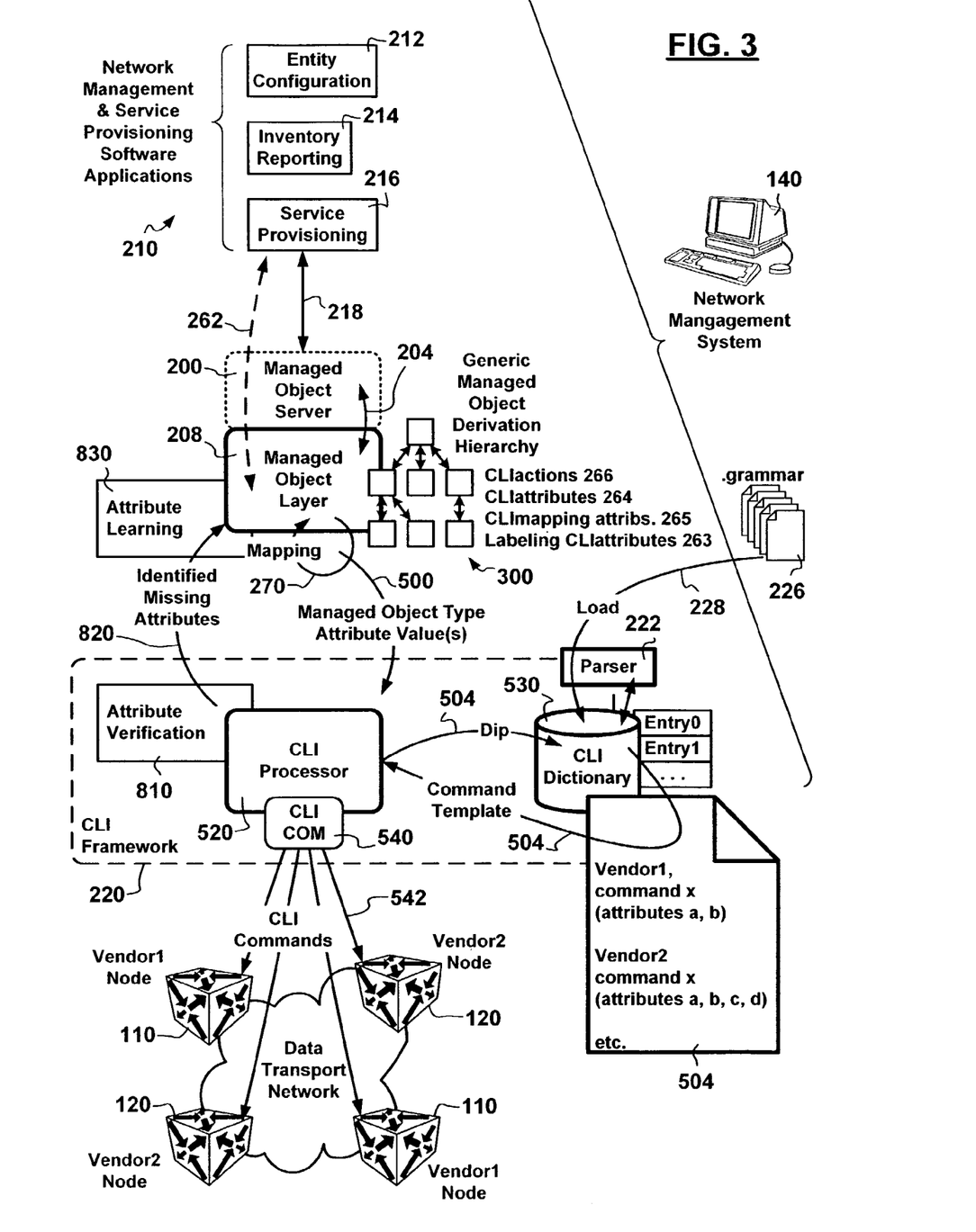
FIG. 3 is a schematic diagram showing interconnected components and process steps performed by the components in operating an exemplary embodiment of the invention.

FIG. 3 is a schematic diagram showing interacting elements and process steps implementing a network management and service provisioning solution in accordance with an exemplary embodiment of the invention.

A Managed Object Server (MOS) 200 facilitates the implementation of a software development methodology for coding complex software applications 210 relating to network management and service provisioning.

The MOS 200 implements a new architecture for providing network management and service provisioning solutions. The new architecture categorizes the above presented elements into:

Manageable data network entities representative of field installed data network entities to be configured and controlled in providing network management and service provisioning solutions. The field installed data network entities include:

i. Physical data network equipment installed in the field such as: nodes 102/104, routers, switches, hubs, OC-3 links 108, etc., and ii. Logical data network entities associated with data network equipment installed in the field such as: paths 128, virtual circuits, virtual routers, etc.;

Network management and service provisioning software applications 210 used to configure and control the manageable data network entities. The software applications 210 include as mentioned above: inventory reporting 214, configuration management 212, statistics gathering, performance reporting, fault management, network surveillance, service provisioning 216, billing & accounting, security enforcement, etc. Human-machine interaction with the software applications 210 is provided to an analyst via the at least one NMS 140;

Network management enabling technologies providing interaction between manageable entities and field installed physical data network entities. Enabling technologies include:

i. Data network management and service provisioning protocols: SNMP, CMIP, CLI, DNS, etc., and ii. Data network management and service provisioning devices: databases, DNS servers, etc.

The network management and service provisioning solution may be command driven as specified by the software application 210, as well as event driven as a current state of the managed data transport network(s) in the realm of influence of the management and service provisioning solution changes.

The MOS 200 shields the software applications 210 from intricacies of enabling technologies.

The enabling technologies include support for a concept referred to as "persistence". As mentioned above, each data network entity including data network equipment has an associated group of parameters. These parameters either have an effect on the operation of the data network entity or label the data network entity. The persistence concept encompasses the storage of, access to, reading, writing, modifying, synchronization/reconciliation, etc. of persistence parameters to control the operation of data network entities.

The persistence parameters can be stored in a network management and service provisioning database, as well in registers associated with the managed physical data network equipment installed in the field. The persistence access to, reading of, writing of, modification of these parameters is provided via the enabling technologies including but not limited to the data network management and service provisioning protocols mentioned above. Persistence reconciliation and synchronization is performed, for example, between a persistence database and a persistence value held in a volatile register ensuring a correct record keeping thereof, fast access to the persisted information and backup thereof. Storage of persistence information is also used in reconfiguring data network equipment subsequent to network failures. Persistence reconciliation and synchronization may be envisioned to be performed between end communications network equipment associated for example with a physical link, a data link, a path, a service, etc.

The persistence concept also encompasses special persistence types such as: constant persistence which can only be initialized but not modified or written to subsequently; as well as derived persistence which is not stored but rather calculated from other persistence values when needed.

In accordance with the preferred embodiment of the invention, coding techniques used in support of the preferred software development methodology enable on-demand loading of enabling technology support. These coding techniques implement what are known in the art as software application persistence entity plug-ins such as, but not limited to: SNMP enabling technology plug-ins, CMIP enabling technology plug-ins, CLI enabling technology plug-ins, database plug-ins, etc. These plug-ins enable persistence. The persistence plug-ins capture data and methods necessary to interact with actual persistence entities (databases, registers, etc.) Each persistence plug-in includes a shared library (.so) file holding a coded description of the functionality it is capable to provide.

In accordance with the preferred software development methodology, the persistence plug-ins are coded in a general fashion without making special reference to the manageable data network entities or the software applications 210. The persistence plug-ins are not to be linked-in with the software application 210 object code. Preferably, persistence plug-ins are provided as shared object code library (.so) files which register with the MOS 200 for on-demand loading thereof.

In accordance with the preferred software development methodology, the software applications 210 are also coded in a general fashion implementing the functionality provided while only making reference to manageable data network entities (via directives) in a high level abstract implementation of the functionality provided. Further details of the software development methodology regarding the software application 210 access to instances of manageable data network entities can be found in: co-pending commonly assigned patent application filed on Dec. 19, 2001 with the United States Patent and Trademark Office by the Applicant entitled "NETWORK MANAGEMENT SYSTEM ARCHITECTURE" bearing Ser. No. 10/021,080 which is incorporated herein by reference; and co-pending commonly assigned patent application filed on Dec. 19, 2001 with the United States Patent and Trademark Office by the Applicant entitled "METHOD OF INVOKING POLYMORPHIC OPERATIONS IN A STATICALLY TYPED LANGUAGE" bearing Ser. No. 10/021,629 which is incorporated herein by reference.

Specific information regarding manageable data network entities is available via the MOS 200 which instantiates, at run-time, and provides interaction 204 with, instances of managed object entities. In particular, the software applications 210 register 218 with the MOS 200 which augments the functionality thereof in brokering access 204 to instances of specific manageable entities and methods associated therewith.

The managed object entity instances exist in a Managed Object Layer (MOL) 208 associated with the MOS 200.

The overall interaction 218/204 between the software applications 210 and the managed object type instances, changes the data network state and/or provides an update of the data network state via the use of enabling technologies.

The instantiation of the managed object types (300) is performed subsequent to the discovery of managed data network entities in the realm of influence of the network management and service provisioning solution. The discovery of physical managed entities is provided via software applications 210 such as the inventory reporting software application 214. The instantiation of managed entity objects may also be a result of the interaction of an analyst with the NMS 140 via the software applications 210.

Figure 4:
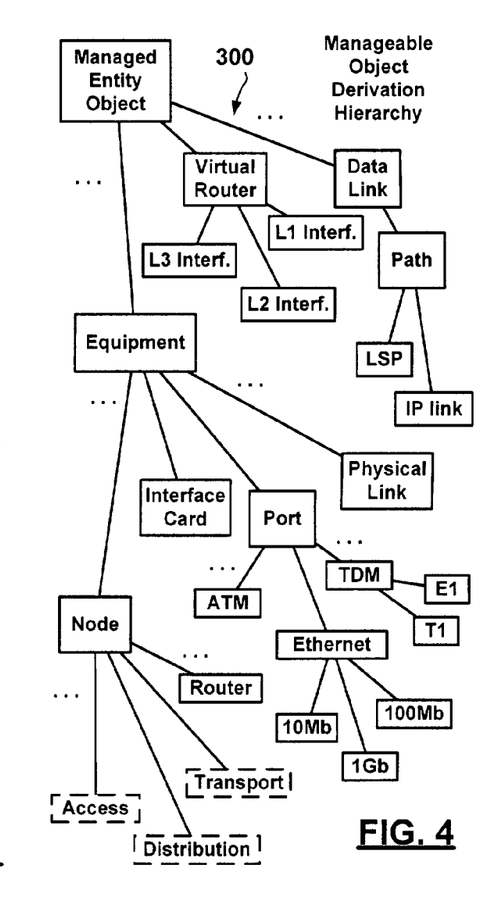
FIG. 4 is a schematic diagram showing a managed entity object hierarchy used in providing the network management and service provisioning solution.
Figure 5:
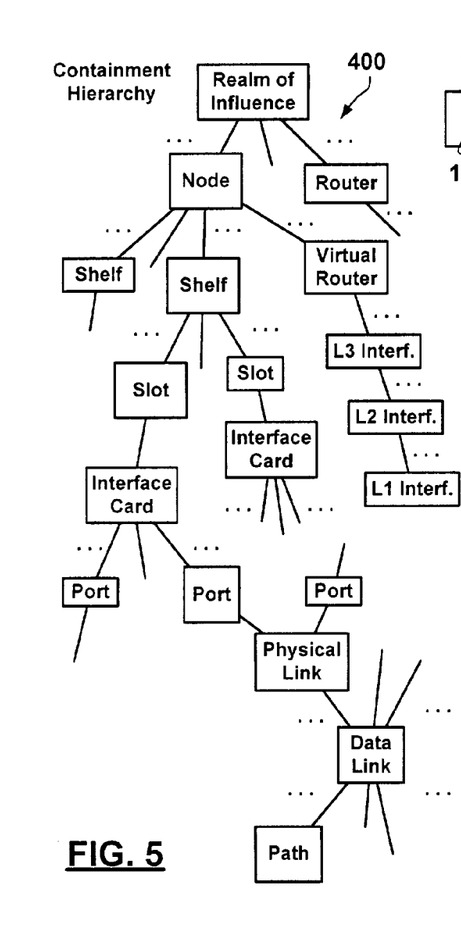
FIG. 5 is a schematic diagram showing an managed entity containment hierarchy used in providing the network management and service provisioning solution.

The MOL 208 makes use of a managed entity object derivation hierarchy 300 shown in FIG. 4 in instantiating managed entity objects. The manageable entity object instances define a managed object entity containment hierarchy 400 presented in FIG. 5. The containment hierarchy 400 may exist only as a combination of associations between instances of managed object entities (but is not limited thereto).

As mentioned above, a specific enabling technology may be used to provide persistence support if the field installed physical data network entity implements and has that particular enabling technology activated. CLI enabling technology support is the focus of the present description. As mentioned above, Command Line Interfaces although not standardized between different vendor equipment, not even for equipment manufactured by a particular vendor, are more prevalent than standardized SNMP support, standardized CMIP support, etc.

A CLI framework 220 is provided. The CLI framework 220 provides command line interface configuration (i.e. persistence) support to managed entity object instances and therefore by extension to software applications 210.

The amount of configuration and/or surveillance of persisted information associated with even the simplest of managed data transport networks tends to be very large. In accordance with a preferred embodiment of the invention, the CLI framework 220 consolidates persistence support for managed data network entities across multi-vendor equipment, as well across multiple vendor-specific equipment types. The CLI framework 220 may include, but is not limited to a combination of hardware, and software application code.

In the interaction 218/204, a software application 210 requests at least one action 262 to be invoked on a managed entity object instance to change operational parameters, as well to change operational states of the corresponding field installed managed communications network entity. A variety of such actions 262 may be used, each of which may represent either a "basic action" or may be decomposed in a group of basic actions. A non-exhaustive list of basic actions 262 includes: create, update, read, delete actions, etc. In accordance with the preferred software development methodology, basic actions 262 implementations transcend each one of the software applications 210 registered with the MOS 200 leading to a generic solution implementation.

In accordance with the invention, the provision of CLI configuration of managed data network entities is enabled through special purpose CLIattributes 264 and methods implemented by the manageable entity objects (300). The special purpose methods include CLI specific side-effect actions 266 such as but not limited to: CLIcreation, CLIdeletion, CLIread, CLIupdate actions, etc.

A mapping function 270 is performed between basic actions 262 and CLIactions 266 to shield the software applications 210 from the intricacies of enabling technologies, in this case the CLI enabling technology. CLImapping specifications are consulted by the mapping function 270 as the implementation of basic actions 262 need CLI persistence support. Some basic actions 262 may only change CLIattributes 264. The change in CLIattributes 264 may in turn trigger CLIactions 266. The implementation of the solution makes use of a special purpose CLImapping attributes 265 which hold mapping specifications.

The mapping function 270 is also necessary as the basic actions 262 may be atomic with respect to the software applications 210 while at the same time the basic actions 262 represent high level actions to be implemented via atomic CLIactions 266.

The correspondence between a particular managed entity object instance and the corresponding managed data network entity is provided via a unique CLI identification attribute (CLIid). Managed entity object instances such as physical links 108, paths 128, etc. always have two ends associated therewith. The configuration of physical links 108, paths 128, etc. is effected solely by configuring the ends thereof. Further information regarding CLIid specification can be found in the above mentioned co-pending commonly assigned U.S. patent application Ser. No. 10/115,900.

Other CLIattributes 264 may include: CLIreadUserID, CLIreadPassword, CLIwriteUserID, CLIwritePassword, internetAddress, etc., where relevant. CLIactions 266 may use the CLIattributes 264 as parameters as specified via CLI mapping attributes 265.

In providing persistence support, the interaction between the MOS 200 and the CLI framework 220 may be implemented via exchanged messages requesting CLIactions 266 to be taken in effecting changes to the operational parameters of managed data network entities. For this purpose, the CLI framework 220 registers with the MOS 200 to provide the persistence support. Changes to managed entity object instances are event-notified 500 to the CLI framework 220.

The CLI framework 220 comprises: a CLI processor 520 (CLIP), a CLI dictionary 530, and CLI COMmunications module 540 (CLICOM).

In accordance with the preferred solution coding methodology, the CLI framework 220 is coded in a generic fashion and is adapted to load and parse 222 at run-time .grammar files 226. Each .grammar file 226 holds specifications of a CLI vocabulary and an associated grammar to be used in configuring and controlling at least one particular managed data network entity (providing persistence support). The grammar and vocabulary between other things, specify, without being limited to, the: CLI command names, associated parameters, valid parameter ranges, parameter typecasting rules, parameter conversions, parameter unit specifications, parameter unit conversions, as well as contexts in which the CLI commands may be issued.

In accordance with the preferred software development methodology the use of .grammar files 226 enables a generic coding of the CLI framework 220—the loading 228 of updated .grammar files 226 enables the modification of the interaction with data network entities with preferably little and ultimately no changes to the CLI framework 220 code.

The CLI vocabulary and grammar described in the .grammar files 226 is compiled into the CLI dictionary 530. The CLI dictionary 530 further codifies the CLI commands, the relations between CLI commands, and how the CLI commands relate to managed data network entities. Facilities such as a persistent storage may be provided for the storage and loading of the CLI dictionary 530 between CLI framework 220 restarts.

The CLI processor 520 receives notifications 500 from the MOS 200 including requested CLIactions 266 to be performed. Having received a notification 500, the CLI processor 520 makes use of CLImapping attribute(s) 265 to query 504 CLI dictionary entries held in the CLI dictionary 530.

The CLI framework 220 interacts 542 with the corresponding field installed managed data network entity(ies) via the CLICOM module 540 for each CLIaction 266 as well if a particular CLIattribute 264 change requires persistence support.

A CLI command sequence is built to implement the specific CLIaction 266 (CLIcreate, CLIupdate, CLIread, CLIdelete etc.) based on the grammar specified in corresponding CLI dictionary entries to operate on the managed data network entity.

The CLICOM module 540 sends 542 each CLI command sequence to the corresponding managed data network entity for execution. Further details regarding the CLICOM module 540 are presented in the above mentioned co-pending commonly assigned patent application Ser. No. 10/115,900.

The managed data network entity 510, executes each CLI command in a received CLI command sequence.

A reduction in operational overheads is sought while retaining investment risk leverage benefits provided by employing multi-vendor equipment. The automation of Command Line Interface (CLI) command-based configuration and control tasks represents one of the ways in which such operational overhead reductions may be achieved.

Although the co-pending commonly assigned patent application Ser. No. 10/115,900 mentioned above makes great strides in automating CLI based network management and service provisioning, by generating CLI command sequences according to CLI grammar and vocabulary specifications of different equipment vendors, the solution shields only the software applications 210 from the complexity and diversity of the CLI enabling technology. The solution comes short of shielding the MOL 208 from the intricacies of the CLI enabling technology as attribute dependencies need to be known to the MOL 208 in implementing such solutions. In the prior solution, the mapping function 270 has to have knowledge of vendor specific CLI command attributes, as values for these need to be provided to the CLI framework 220 to generate and issue CLI commands to managed data network entities. In particular attribute dependencies are specified via the CLI mapping attributes 265 for each vendor specific equipment type. This represents a problem as the manageable object derivation hierarchy 300, by being coded with vendor specific attributes, needs to be updated, re-compiled and re-deployed with each vendor specific CLI vocabulary and/or grammar change as command attributes change. It is desirable to reduce these operational overheads incurred by updates to attribute dependencies.

Therefore it is desirable to also shield the MOL 208 from changes to vendor specific CLI command syntax changes in order to minimize updating thereof.

In accordance with an exemplary embodiment of the invention, as vendor equipment specific info is held in the CLI framework 220 and in particular in the CLI dictionary 530; the CLI processor 520 is provided with a new functionality: attribute verification 810, to check for required attributes and inform 820 the MOL 208 of any required attributes missing from the notification(s) 500.

When the CLI processor 520 builds a CLI command, it checks 504 the command syntax (vocabulary and grammar) for the particular command and vendor, which is stored in the CLI dictionary 530, to determine if all of the required attributes have been supplied. If any attributes are missing, the CLI processor 520 informs 820 the MOL 208 of the absence thereof in connection with the particular CLIaction 266 requested and by extension in connection with the event notification 500 received.

An example is the configuration of a port 112. Depending on the association of the port 112 with a node 110 (vendor1) or a node 120 (vendor2), shelf 122 and interface card 124 specifications may be needed. Attributes specifying shelf 122 and interface card 124 information may need to be provided.

In accordance with the exemplary embodiment of the invention, the MOL 208 is also provided with new attribute learning functionality 830, to learn of and keep track of attribute requirements provided by the CLI processor 520. Whenever the CLI processor 520 informs 820 the MOL 208 of missing attributes for a particular CLIaction 266 for a certain vendor's node, the MOL 208 records which attributes are required for future use. While this function adds some complexity to the MOL 208, it removes the need to hard-code CLI attribute dependencies in the manageable object derivation hierarchy 300 reducing operational overheads associated with updating the associated CLI command syntax. If the CLI attribute dependencies change, the MOL 208 simply adapts to the changes based on the information 820 provided by the CLI processor 520 proving a dynamic determination CLI attribute dependency updates.

In accordance with an exemplary embodiment of the invention, the manageable object types of the manageable object derivation hierarchy 300 are coded generically. The generic coding is further enabled via a labeling CLIattribute 263 associated with each instantiated managed object entity which holds a vendor/equipment type specification to provide support for vendor/equipment type specific attribute validation. The labeling CLIattribute 263 may be populated in instantiating the managed object hierarchy. The CLIid attribute may hold the vendor/equipment type specification. In using the CLIid attribute to specify the vendor/equipment type specification, the vendor/equipment type specification maybe derived in deriving the CLIid attribute using methods described in the above mentioned co-pending commonly assigned patent application Ser. No. 10/115,900. Not only does the proposed solution shield the MOL 208 from the changes to vendor specific CLI syntax changes, but also from vendor specifics all together syntax complexities and variances of CLI commands between different vendor equipment.

In accordance with an exemplary interaction between the MOL 208 and the CLI processor 520, the MOL 208 uses a reactive method of issuing event notifications 500. The MOL 208 issues an event notification 500 with attributes based on generic, plausible, de facto, etc. notification generation specifications (CLImapping attributes 265) previously used by the mapping process 270. The event notification 500 includes the corresponding CLIid and vendor/equipment type specification. The attribute verification function 810 makes use of the CLIid and vendor/type specification to consult 504 the CLI dictionary 530 entries. If discrepancies are detected then the implementation of the issued notification 500 fails and the CLI processor 520 provides 820 the MOL 208 with corrective feedback including the correct necessary CLIattributes. The learning function 830 receives the corrective feedback and stores knowledge about any newly required CLIattributes 264 in corresponding CLImapping attributes 265. The mapping function 270 is therefore updated. The MOL 208 sends the event notification 500 with the required CLIattributes 264.

In implementing a particular CLIaction 266 it may be possible that the CLI processor 520 needs to build a long sequence of CLI commands. Each CLI command may require additional CLIattributes 264. The event notification 500 therefore may fail until the entire CLI command sequence implementing the necessary CLIaction 266 is built successfully. A significantly large processing overhead may be incurred initially. As CLI syntax changes are rare however, subsequent implementations of the same CLIaction 266 benefit from the one time learning.

In accordance with another exemplary interaction between the MOL 208 and the CLI processor 520, the MOL 208 uses a proactive method of issuing event notifications 500. The MOL 208 first queries (500) the CLI processor 520 for required CLIattributes 264 in implementing a particular CLIaction 266 on a particular managed communications network entity having a CLIid and a vendor/equipment type specification. The CLI processor 520 consults 504 the CLI dictionary 530 and provides 820 the MOL 208 with corrective feedback specifying the necessary group of CLIattributes 264 for implementing the event notification/CLIaction 266. The learning function 830 stores knowledge about any newly required CLIattributes 264 in corresponding CLImapping attributes 265. The mapping process 270 is therefore updated. The MOL 208 subsequently sends a fully qualified event notification 500 to the CLI processor 520 requesting persistence support.

As CLI syntax changes are rare, an ongoing processing overhead is incurred as subsequent same CLIactions 266 do not benefit from subsequent queries 500 wherein the need for required attributes has already been learned. However the processing overhead incurred in learning 830 of the correct attribute dependencies is minimized as corrective feedback is provided only once for each event notification 500.

It is understood that, in accordance with the above described implementation, the MOL 208 provides a consolidation of communications network management information for network management and service provisioning. In accordance with another embodiment of the invention, network management and service provisioning software applications 210 interact directly with the CLI processor 520. In such implementations, the generic manageable object derivation hierarchy 300 and the learning function 830 are associated with each software application 210. In this sense the MOL 208 and software applications 210 represent CLI client entities served by the CLI framework 220 with CLI enabling technology support.

In accordance with a preferred implementation of the invention, multiple CLIactions 266 are preferably processed by the CLI framework 220 in parallel. Care is to be taken in coding such implementations to eliminate configuration conflicts. The elimination of configuration conflicts as well as the prioritization of configuration changes may be implemented via queuing of CLIactions 266 to be processed by the CLI framework 220. The parallel processing requires the use of multi-threading, multi-tasking coding techniques known to persons of skill in the art and are described elsewhere.

The present invention automates the CLI command entry task in a network management and service provisioning environment comprised of diverse data network entities each of which has an associated CLI vocabulary. A CLI command dictionary 530 consolidates all data network entity specific CLI vocabularies and serves the CLI framework 220 with vendor/equipment type specific CLI commands for building CLI command sequences. The attribute verification function 810, exchanged discrepancy information 820 and the learning function 830 enable a generic deployment of network management and service provisioning solutions.

The embodiments presented are exemplary only and persons skilled in the art would appreciate that variations to the above described embodiments may be made without departing from the spirit of the invention. The scope of the invention is solely defined by the appended claims.

We claim:

1. A command line interface (CLI) framework of a network management system (NMS) for invoking an action as requested by a managed object server (MOS) of said NMS, said action to be performed by a vendor-specific managed data network entity, the CLI framework comprising:
   a validation module for assessing a correctness of a set of attributes of a notification acting as a request for said invoking of said action and received by the CLI framework from said MOS, said validation module for, in an event said set of attributes of said notification are assessed by said validation module to be incorrect, providing to said MOS a corrective attribute feedback output for enabling said MOS to learn a correct set of attributes to enable said MOS to generate a correct notification with a correct set of attributes to act as a correct request for said invoking of said action;
   a processor for generating, in an event said set of attributes of said notification are assessed by said validation module to be correct, a CLI command sequence for invoking performance of said action, with use of said notification and a plurality of CLI vocabulary and grammar specifications; and
   a communications module for sending the CLI command sequence to said vendor-specific managed data network entity, for execution by said vendor-specific managed data network entity to perform said action as requested by said MOS.

2. A CLI framework as claimed in claim 1, further comprising a CLI dictionary having a plurality of dictionary entries for storing said plurality of CLI vocabulary and grammar specification, wherein said plurality of CLI vocabulary and grammar specifications correspond to a plurality of CLI commands recognized by said vendor-specific managed data network entity.

3. A CLI framework as claimed in claim 2, wherein said plurality of dictionary entries specify for each CLI command of said plurality of CLI commands a corresponding set of CLI command parameters, wherein said validation module assesses said correctness of said set of attributes of said notification with use of CLI command parameters corresponding to each CLI command of said CLI command sequence for invoking said action.

4. A CLI framework as claimed in claim 1, further comprising a parser for extracting from a plurality of grammar files for said vendor-specific managed data network entity and for other network entities managed by said NMS, said plurality of CLI vocabulary and grammar specifications, and for populating a plurality of dictionary entries with said plurality of CLI vocabulary and grammar specifications.

5. A CLI framework as claimed in claim 1, wherein said validation module performs said assessing of said correctness of said attributes of said notification by comparing said attributes with a list of all required attributes for said notification to enable said processor to generate each CLI command of said CLI command sequence and informs said MOS of any missing attribute.

6. A managed object server (MOS) for interacting with CLI framework as claimed in claim 1, in order to control the operation of said vendor-specific managed data network entity, said MOS comprising:
   a notification generator for generating said notification acting as said request for said invoking of said action to be performed by said vendor-specific managed data network entity, and for providing said notification to said CLI framework; and
   a learning module for receiving said corrective attribute feedback output from said CLI framework and for learning said correct set of attributes for use by said notification generator to generate said correct notification.

7. A command line interface (CLI) client entity for a network management system (NMS) provided with a CLI framework, the CLI client entity comprising:
   a notification generator for issuing a notification, said notification generated in accordance with vendor-specific notification generation specifications and to interact with at least one managed data network entity, said vendor-specific notification generation specification specifying a set of attributes determining a formatting of said notification during generation of said notification; and
   a learning module operable for amending said vendor-specific notification generation specifications based on corrective attribute feedback, said corrective attribute feedback being received by said CLI client entity from said CLI framework in response to the CLI framework's receiving of said notification, wherein said notification is incorrectly formatted, wherein said amending of said vendor-specific notification generation specification is performed with use of said corrective attribute feedback, generating correct vendor-specific notification generation specifications specifying a set of correct attributes which determine a correct formatting of a correct notification, wherein the learning module enables a generic implementation of the CLI client entity adaptive to changes in respect of any one of managed data network entity, vendor, and managed object.

8. A CLI client entity as claimed in claim 7, further comprising CLI mapping attributes holding the vendor-specific notification generation specifications, the CLI mapping attributes being updated by the learning module in amending the vendor-specific notification generation specifications.

9. A method of configuring a vendor-specific network entity of a plurality of network entities of a network managed by a network management system (NMS) having a command language interface (CLI) framework and a CLI client, each network entity of said plurality of network entities being of a same type of network entity and being from one of at least two different vendors, the method comprising:
   sending to said CLI framework from said CLI client an event notification comprising a set of attributes requesting a specific CLI action to be performed by said vendor-specific network entity;

providing, in an event said set of attributes of said event notification are incorrect, said CLI client with corrective feedback for enabling said CLI client to generate said notification with a correct set of attributes;

generating at said CLI framework, a CLI command sequence vendor specific to said vendor-specific network entity, based on said specific CLI action using a CLI dictionary maintained by said CLI framework; and transmitting said CLI command sequence to said vendor-specific network entity for causing said vendor-specific network entity to perform said action by operating as instructed by said CLI command sequence.

10. A method according to claim 9, wherein generating said CLI command sequence comprises:

creating each CLI command of said CLI command sequence by mapping said each CLI command to a corresponding set of attributes necessary for performing said action;

accessing said CLI dictionary for verifying compliance of a vocabulary and syntax used by each command of said CLI command sequence to the type of said vendor-specific network entity; and verifying with said CLI dictionary an accuracy of said corresponding set of attributes corresponding to the type of said vendor-specific network entity.

* * * * *